United States Patent

[11] 3,610,744

| [72] | Inventors | Tokusaburo Kakiuchi;<br>Hideaki Akiyama, both of Tokyo, Japan |
|---|---|---|
| [21] | Appl. No. | 828,194 |
| [22] | Filed | May 27, 1969 |
| [45] | Patented | Oct. 5, 1971 |
| [73] | Assignee | Kabushiki Kaisha Ricoh<br>Tokyo, Japan |
| [32] | Priority | June 3, 1968 |
| [33] | | Japan |
| [31] | | 43/46368 |

[54] DEVICE FOR ENGAGING FILM WITH SOUND SPROCKET WHEEL OF A CARTRIDGE TYPE TALKIE CAMERA OR PROJECTOR
2 Claims, 4 Drawing Figs.

[52] U.S. Cl. .................................................. 352/27,
352/72
[51] Int. Cl. ................................................ G03b 31/02
[50] Field of Search .......................................... 352/27–30,
37, 72–78; 226/84, 85

[56] References Cited
UNITED STATES PATENTS

| 3,358,892 | 12/1967 | Johnson et al. ............... | 352/29 X |
| 3,442,580 | 5/1969 | Winkler ........................ | 352/29 |
| 3,447,865 | 6/1969 | Bottani ......................... | 352/27 |

*Primary Examiner*—Louis R. Prince
*Assistant Examiner*—William A. Henry, III
*Attorney*—Burgess, Ryan and Hicks ABSTRACT: A device for engaging a film with a sound sprocket wheel of a cartridge-type talkie camera or projector in which a pair of roller levers each carrying a roller are pivotally attached to a film cartridge so that the rollers serve to securely engage the film with the sound sprocket wheel without causing any slacking when the film cartridge is inserted into the camera or projector. The pair of levers are first closed, but gradually spaced apart from each other as the cartridge is inserted causing the rollers to press the film against the sprocket wheel. The film may be engaged with a considerable portion of the periphery of the sprocket wheel without slacking.

INVENTORS
TAKUSABURO KAKIUCHI
HIDEAKI AKIYAMA
BY
Burgess, Ryan & Hicks
ATTORNEYS

3,610,744

DEVICE FOR ENGAGING FILM WITH SOUND SPROCKET WHEEL OF A CARTRIDGE TYPE TALKIE CAMERA OR PROJECTOR

BACKGROUND OF THE INVENTION

The present invention relates to a device for engaging a film with a sound sprocket wheel of a cartridge-type talkie camera or projector and more particularly a device of the type described which can securely engage the film with the sound sprocket wheel without any slacking.

In talkie movie cameras or projectors incorporating magnetic recording or reproducing devices, a pair of sound rollers are provided for engaging a film having a magnetic sound track with a predetermined portion of the periphery of a sound sprocket wheel. Sound is recorded or reproduced through a sound head located in closely spaced-apart relation with the film lapped over the sound sprocket wheel. However, when the film is not securely engaged with the sound sprocket with nonuniform tension and slacking, vibrations are caused by the intermittent movement of the film and by the disengagement of the teeth of the sprocket wheel from the perforations of the film so that better recording or reproduction is not expected. That is, wow and flutter are produced.

Especially in the case of the cartridge-type movie cameras or projectors in which the film in the cartridge is automatically engaged with the sound sprocket wheel when the cartridge is inserted, it is very difficult to securely engage the film with the sound sprocket wheel so that no wow and flutter are produced. Various attempts have been tried, but so far this problem has not been satisfactorily solved.

SUMMARY OF THE INVENTION

In brief, the present invention provides a novel device for engaging a film with a sound sprocket wheel of a talkie movie camera or projector in which a pair of roller levers each carrying a roller pivotably attached to a film cartridge in such a manner that when the film cartridge is inserted into the camera or projector the rollers serve to press the film against the sprocket wheel so that the film may be securely engaged with the sound sprocket wheel.

The pair of roller levers pivotably attached to the film cartridge have a tendency to normally move toward each other by for example a spring. Therefore, when the cartridge is inserted into the movie camera or projector, first the rollers in contact with each other press the film against the sound sprocket wheel. As the cartridge is further inserted, the rollers are gradually outwardly spaced apart from each other, but remain in rolling contact with the sprocket wheel through the film so that the film may be securely engaged with the sprocket wheel without causing any slacking, whereby wow and flutter can be prevented.

The primary object of the present invention is to provide a device simple in construction and reliable in operation for engaging a film with a sound sprocket wheel of a cartridge-type talkie movie camera or projector.

The above and other objects, features and advantages of the present invention will become more apparent from the following description taken in conjunction with the accompanying drawing.

DESCRIPTION OF THE PREFERRED EMBODIMENT

Figure 1:
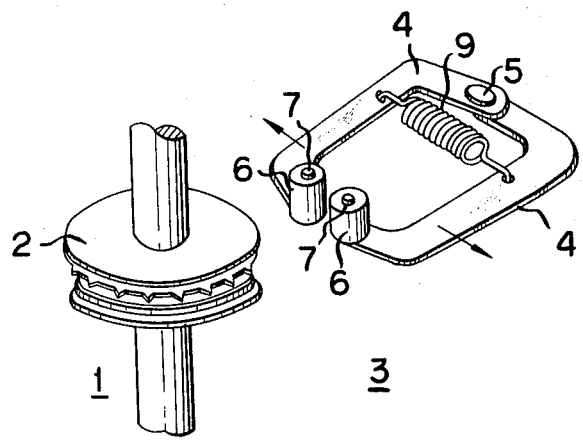
FIG. 1 is a perspective view of the principal parts of a device according to the present invention.

Referring to the drawing, reference numeral 1 designates for example a talkie projector or its main body not shown; 2, a detachable sound sprocket wheel mounted in the projector; 3, a film cartridge detachably mounted in the projector; 4, a pair of sound roller levers coaxially fixed to a pivot 5; 6, sound rollers each rotatably carried by a free end of the lever 4 by means of a pivot 7; 8, film; and 9, a tension spring loaded between the pair of roller levers 4.

When the cartridge 3 is mounted in the projector 1, the free ends of the sound roller levers 4 are closed by the spring 9 so that the two rollers contact with each other. In this state, the film 8 is guided and engaged with the teeth nearest to the cartridge 3 (the rightward teeth) of the sprocket wheel 2. This is shown by the solid line in FIG. 2. When the cartridge 3 is further inserted toward the projector 1, the rollers 6 are spaced apart from each other against the spring 9 while securely extending the film 8 around the periphery of the sprocket wheel 2. Thus, the film 8 is more securely engaged with the teeth of the sprocket wheel 2 upon completion of the insertion of the cartridge 3 as shown by the chain line in FIG. 2. When the cartridge 3 is fully inserted, the film 8 is extended by the rollers 6 from the center of the portion engaging with the sprocket wheel 2 in both directions around the periphery so that the film 8 is securely engaged with the sprocket wheel without any slacking. A sound head (not shown) is extended into the space between the rollers 6 when the latter are spaced apart from each other by a suitable distance so that the sound head is located in opposed relation with the sound track (not shown) of the film 8.

Figure 2:
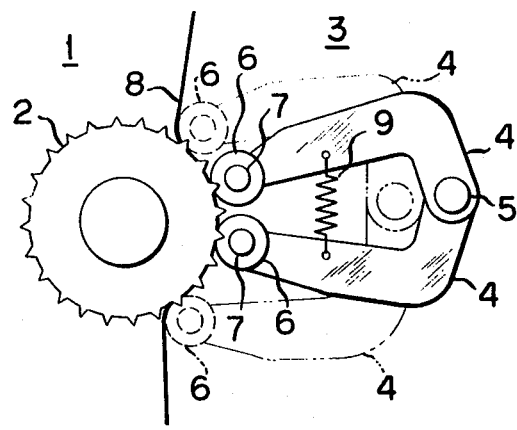
FIG. 2 is a plan view showing the engagement of the film with a sound sprocket in the device of the present invention.

The projection or photographing is made when the sound rollers 6 and the sound roller levers 4 are located as shown by the chain line in FIG. 2 and the film 8 is in engagement with the sprocket wheel 2. It will be seen that the film 8 is securely engaged with the sprocket wheel 2 and is pressed against the sprocket wheel 2 by the rollers 6 at the portions of the sprocket wheel 2 where the film disengages therefrom so that vibrations caused by the intermittent movement of the film and the disengagement of the teeth of the sprocket wheel 2 from the perforations of the film 8 may be attenuated sufficiently. Thus, the film 8 may be always securely engaged with the sprocket wheel 2 when the film is being advanced so that the better sound recording or reproduction by the sound head may be ensured.

In the above-described embodiment, the sound rollers and the pair of sound roller levers have been shown as being identical in construction and dimension, but it is to be understood that the present invention is not limited to such construction, arrangement and dimensions. For example, each of the sound roller levers 4 may be pivoted independently. Furthermore, means for applying the resilient force to the rollers 6 is not limited to the arrangement shown in the drawing and any other suitable means may be utilized.

Figure 3:
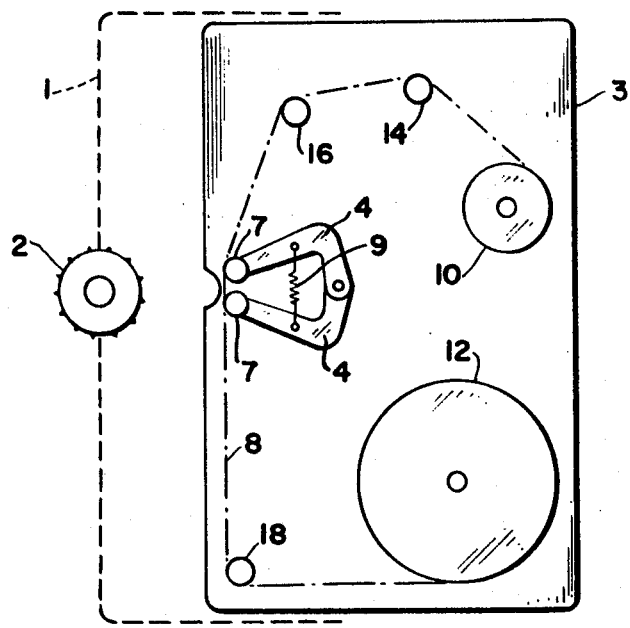
FIG. 3 is a schematic view illustrating the device within a cartridge that is partially inserted in a camera or projector.
Figure 4:
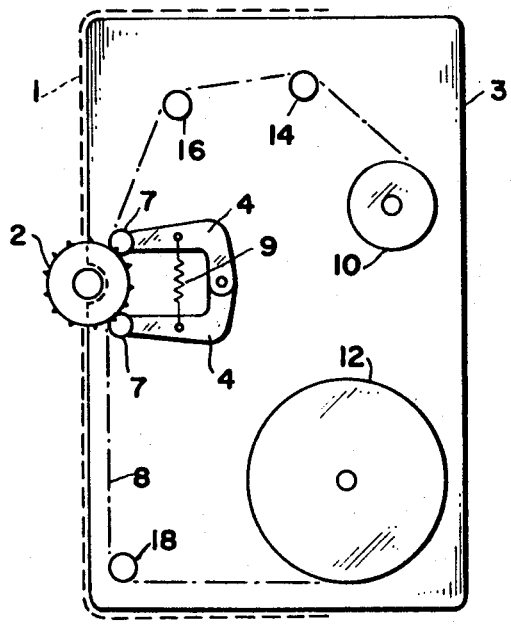
FIG. 4 is a view similar to FIG. 3 with the cartridge fully inserted and the film engaged with the sprocket.

FIGS. 3 and 4 illustrate the insertion operation of the engaging device when it is mounted in cartridge 3. Spools 10 and 12 are conventional for the purpose of winding and unwinding film 8, and conventional rollers 14, 16 and 18 guide film 8 along the path to sprocket 2 between spools 10 and 12. As seen in FIG. 3, during partial insertion of cartridge 3 into projector 1, levers 4 are drawn together by spring 9. Upon full insertion as shown in FIG. 4, rollers 6 and levers 4 are displaced apart, and film 8 is tightly engaged around sprocket 2.

We claim:

1. In combination with a film cartridge for a movie camera or projector, the cartridge slidably insertable into the camera or projector to engage the film therein around a sound sprocket wheel in said movie camera or projector:
    a pair of curved levers each mounted on one end to a common pivot on said cartridge;
    biasing means connecting an intermediate point of each lever to each other and tending to keep said levers together;
    a sound roller mounted on each other end of said lever;

said sound rollers having a first position when said cartridge is not inserted, said sound rollers located adjacent to each other in said first position and said rollers being out of engagement with said sprocket wheel, and said sound rollers having a second position when said cartridge is inserted, said sound rollers spaced remotely apart from each other in said second position and engaging the periphery of said sprocket wheel to hold the film tightly on said sprocket wheel.

2. The combination of claim 1 in which each lever has an intermediate straight portion and end portions, said end portions thereof being curved to form end legs extending substantially perpendicularly toward the other lever, the end leg having the pivot at one end being longer than the end leg having the sound roller mounted thereon, and the biasing means connecting said intermediate portions comprising a spring.